US008513614B2

(12) United States Patent
Kraft et al.

(10) Patent No.: US 8,513,614 B2

(45) **Date of Patent: *Aug. 20, 2013**

(54) METHOD AND CIRCUIT ARRANGEMENT FOR DETERMINING AN INTENSITY OF IONIZING RADIATION

(75) Inventors: Edgar Kraft, Erlangen (DE); Daniel Niederlöhner, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 518 days.

This patent is subject to a terminal disclaimer.

(21) Appl. No.: 12/766,371

(22) Filed: Apr. 23, 2010

(65) Prior Publication Data

US 2010/0270473 A1 Oct. 28, 2010

(30) Foreign Application Priority Data

Apr. 27, 2009 (DE) ........................ 10 2009 018 995

(51) Int. Cl.
*G01T 1/24* (2006.01)

(52) U.S. Cl.
CPC ........................................ *G01T 1/24* (2013.01)
USPC ...................................................... 250/370.09

(58) Field of Classification Search
USPC ...................................................... 250/370.09
See application file for complete search history.

(56) References Cited

U.S. PATENT DOCUMENTS

| | | | | |
|---|---|---|---|---|
| 4,591,984 | A * | 5/1986 | Mori | 250/363.07 |
| 6,759,658 | B2 | 7/2004 | Overdick et al. | |
| 7,149,278 | B2 * | 12/2006 | Arenson et al. | 378/19 |
| 7,829,860 | B2 * | 11/2010 | Nygard et al. | 250/370.09 |
| 7,943,907 | B2 * | 5/2011 | Eversmann et al. | 250/395 |
| 2002/0109091 | A1 * | 8/2002 | Overdick et al. | 250/336.1 |
| 2009/0194703 | A1 | 8/2009 | Eversmann et al. | |

FOREIGN PATENT DOCUMENTS

| | | |
|---|---|---|
| DE | 102007034982 A1 | 2/2009 |
| DE | 10 2008 005 373 | 7/2009 |
| EP | 1231485 A3 | 8/2006 |

OTHER PUBLICATIONS

Office Action issued Jan. 10, 2012, in corresponding German Patent Application No. 10 2009 018 995.5.

Knoll Glenn F.; "Radiation Detection and Measurement"; John Wiley & Sons, pp. 95-103; New York (1979); Others; 1979.

Kraft, Edgar, Uni Bonn, Phys. Institut; Others; 2008.

Kraft, Edgar et al., "Counting and Integrating Readout for Direct Conversion X-Ray Imaging: Concept, Realization and First Prototype Measurements", IEEE Transactions on Nuclear Science, vol. 54, No. 2, Apr. 2007, pp. 383-390; Others; 2007.

* cited by examiner

*Primary Examiner* — David Porta
*Assistant Examiner* — Edwin Gunberg
(74) *Attorney, Agent, or Firm* — Harness, Dickey & Pierce, P.L.C.

(57) ABSTRACT

A method is disclosed for determining the intensity of ionizing radiation using a detector with a multiplicity of direct-conversion detector elements, in particular for use in a CT system. In at least one embodiment, the method includes supplying the signal pulses to a preamplifier/signal conditioner, supplying the amplified and conditioned signal pulses to two pulse-height discriminators connected in parallel or in series, registering by a combination logic, and transmitting the registered signal pulses to a counter. In at least one embodiment, provision is made for feedback, by which, firstly, the pulse shape of the signal pulses and, secondly, the clock rate of the clocked pulse-height discriminator are set as a function of the signal frequency. Furthermore, at least one embodiment of the invention relates to a circuit arrangement for measuring signals of a direct-conversion detector, in particular for use in a CT system, by which the method according to at least one embodiment of the invention can be carried out.

15 Claims, 3 Drawing Sheets

METHOD AND CIRCUIT ARRANGEMENT FOR DETERMINING AN INTENSITY OF IONIZING RADIATION

PRIORITY STATEMENT

The present application hereby claims priority under 35 U.S.C. §119 on German patent application number DE 10 2009 018 995.5 filed Apr. 27, 2009, the entire contents of which are hereby incorporated herein by reference.

FIELD

At least one embodiment of the invention generally relates to a method for determining the intensity of ionizing radiation using a detector with a multiplicity of direct-conversion detector elements. At least one embodiment relates to such a method for use in a CT system, wherein the radiation generates electrical signals with a certain pulse shape and signal frequency and the number of the signal pulses are deemed a measure of the radiation intensity, having the following method steps:

supplying the signal pulses to a preamplifier/signal conditioner;

supplying, in parallel or in series, the amplified and conditioned signal pulses, firstly, to a pulse-height discriminator operating continuously and with a predetermined energy threshold and, secondly, to a clocked pulse-height discriminator operating with a predetermined clock rate and a predetermined energy threshold, registering the signal pulses by a combination logic, and transmitting the registered signal pulses to a counter.

BACKGROUND

Scintillation detectors have previously been used for detecting gamma radiation and X-ray radiation, particularly in CT systems and dual-energy CT systems. In these detectors, the incident radiation is detected indirectly by the excitation of electrons and the conversion thereof into photons. Additionally, counting detector systems are being developed, in which individual photons of the incident radiation can be counted, and so there is direct detection of the radiation. In the process, an electrical pulse is generated, the area of which—and, approximately, the height of which as well—is proportional to the amount of charge and, thus, to the energy of the absorbed photon. Correct scanning and digitizing of the electrical pulses generated thereby, in particular resolving the number and height of the occurring pulses, is non-trivial.

However, a basic problem of using these direct-conversion detectors in CT systems lies in the handling of the high photon fluxes that have to be processed. These are generated in the successive signal pulses that, with a high probability, are incident almost simultaneously. This phenomenon, known as "pile-up", leads to saturation or paralysis of the detector. Moreover, the response of the comparator changes in the case of high fluxes. The comparator, for example in the form of a continuously operating pulse-height discriminator, compares the input signal to a predetermined energy threshold and emits a corresponding output signal. In the process, there can be a rate-dependent shift in the effective energy threshold used to register the signals in the detector.

If the detector can be paralyzed as a result of its design, the measured signals can no longer be unambiguously assigned to the photon rate because fluxes that are too high are measured with a lower detection efficiency due to the higher degree of paralysis. This leads to a count result that is too low and the result can also be achieved by lower photon fluxes at a higher detection efficiency of the detector. Hence, the measurement result is ambiguous.

There already are a number of approaches for resolving this ambiguity problem. The laid-open application DE 10 2007 034 982 A1 illustrates an option for increasing the robustness in comparison with a variation in the pulse width in the case of a clocked signal scan by setting the scanning rate so high that, as a result of this, the scanning time-interval is less than the average expected pulse width. However, this method has not solved the problem of an optimum energy resolution in the case of low photon fluxes on the detector.

Moreover, a shortening of the pulse processing time, that is to say the charge collection time and the pulse conditioning time, and a reduction of the photon stream can reduce the probability of the "pile up" effect. This may possibly eliminate the ambiguity problem entirely. This approach is usually insufficient due to material-specific limitations in the detector material and application-dependent requirements.

Likewise, the ambiguity of the signal registration can be resolved by simultaneously measuring the signal flux using an integrating channel. However, this is accompanied by increased circuit complexity and increased amounts of data. This approach is described in, for example, the European patent document EP 1 231 485 A3.

The patent application with the application number DE 10 2008 005 373.2, which does not have a prior publication date, supplies a further approach for resolving the ambiguity. This application describes a method for determining a radiation intensity using a direct-conversion detector, wherein a continuously counting pulse-height discriminator and a pulse-height discriminator counting in a clocked fashion are connected in parallel. The incident signal pulses are amplified by a preamplifier. The continuously counting pulse-height discriminator then generates a count result every time an amplified signal pulse exceeds a set energy threshold.

The advantage of this measure is that the height of the signals can be registered very precisely by varying one or more threshold values and the count rate in the process can be determined independently of a varying pulse width. This type of registration assumes a relatively low photon flux, that is to say non-overlapping signal pulses. In the case of very high fluxes, this concept supplies much underestimated count rates, right up to a paralyzing behavior of the detector. It is for this reason that the clocked pulse-height discriminator is operated in parallel thereto. Like in the case of the continuously operating pulse-height discriminator, the correct number of amplified signals is underestimated when there are high photon fluxes, but the detector no longer exhibits paralyzing behavior. Here, the count rate depends directly on the average pulse width for low fluxes, and so these variations can be problematic.

A combination logic circuit is arranged between the counter and the two pulse-height discriminators in order to avoid the continuous double counting (and hence incorrect counting) of signal pulses. This is advantageous in that, at low fluxes, the continuously operating pulse-height discriminator correctly discriminates the signal pulses in terms of energy while, at high fluxes, the clocked pulse-height discriminator avoids too great an underestimation of the count rate.

Thus, preamplified signals are counted by the clocked pulse-height discriminator, connected in parallel, during phases brought about by the "pile-up", i.e. phases with high fluxes, when the energy threshold in the continuously operating pulse-height discriminator is exceeded for a relatively long time, the clock rate of said clocked pulse-height discriminator having been adapted to the inverse of the pulse conditioning time. This obtains a monotonically increasing count result with increasing photon flux or increasing pulse frequency. In the case of high fluxes with a great number of multiple hits, and thus a great proportion of signal pulses registered in a clocked fashion in the count result, the energy then only infrequently drops below the threshold. Thus, the detector is in a saturation region with dominant activity by the clocked pulse-height discriminator. In the process, the ability to distinguish between measurements with similar high-frequency signal fluxes is reduced. The disadvantage of this approach, or rather of the amplification of the signal pulses by the preamplifier, is that the noise of the input signal is also increased at the same time. Hence, this does not improve the signal-to-noise ratio. The noise is likewise registered by the detector and it may worsen the count result.

SUMMARY

In at least one embodiment of the invention, an improved method is disclosed for detecting signal pulses from direct-conversion detector elements. Furthermore, at least one embodiment of the invention describes a circuit arrangement suitable for this.

The inventors have recognized, in at least one embodiment, that combining the logic from continuous and clocked comparators with adapting of the signal conditioning to the input flux can be used to optimize the compromise between time resolution and energy resolution. Specifically, at least one embodiment of the invention allows good energy resolution (signal-to-noise ratio) at low fluxes and, at the same time, optimized information content (increased linearity) in the case of high fluxes.

The literature (Glenn F. Knoll, "Radiation Detection and Measurement"), the entire contents of which are incorporated herein by reference, has disclosed that a longer signal conditioning time leads to an improved energy resolution due to the increased signal-to-noise ratio. This allows a more reliable distinction in both comparators between signal pulses lying just above the energy threshold and those signal pulses lying just below the energy threshold.

In contrast thereto, in the case of relatively high signal frequencies with signal pulses clearly exceeding the energy threshold, there is a situation in which these pulses merge into one another and they are blurred as a result of too much widening and flattening. Then these can no longer be registered individually by the continuously operating pulse-height discriminator. Thus, according to the invention, the signal conditioner is operated in a frequency-dependent fashion.

In principle, a signal conditioner is a filter with a limited bandwidth, which is adapted to the preamplifier signal. As a result of the bandwidth limitation, large regions of the noise power spectrum are eliminated, and so the signal-to-noise ratio in the filtered signal is higher than in the input signal. Moreover, the resulting pulse shape is largely independent of the specific shape of the original signal. Here, the signal pulse conditioning generally has a characteristic time constant, the signal conditioning time. Shorter signal conditioning times lead to short signal pulses and thus to a better differentiability of closely spaced successive photons or to a lower number of multiple hits. Longer signal conditioning times lead to reduced noise and thus to an improved energy resolution with respect to the photon energy.

At least one embodiment of the invention now resides in finding an optimum compromise between these opposing requirements—differentiability of individual photons and energy resolution—for the current photon rate. For this, the signal conditioning time, the clock rate of the clocked discriminator and, optionally, the energy threshold are adapted by a feedback path.

This can avoid blurring of individual signals at relatively high frequencies and achieve strong widening at low signal frequencies. It follows that a longer signal conditioning time for the signal pulses should be applied at lower signal frequencies than at higher signal frequencies.

At the same time, it is expedient to adapt the clock rate of the clocked pulse-height discriminator to the inverse of the signal conditioning time. This avoids superfluous count results by the clocked pulse-height discriminator.

Optionally, it is also possible, and by all means sensible, to adapt the energy thresholds of the pulse-height discriminators. This means that at relatively low signal frequencies with strongly widened, i.e. strongly flattened, signal pulses, the energy threshold is lowered in order to continue to allow the registration of the signal pulses by the pulse-height discriminators.

In order to allow the frequency-dependent operation of the signal conditioner, the already known circuit arrangement is expanded by an additional return channel and a parameter control unit for monitoring the signal frequency and setting the signal conditioner depending on the frequency. In the process, the basic concept of the known method continues to exist in its entirety. The novel feedback path can for example start at the combination logic, and the current signal frequency—and thus the proportion of the clocked pulse-discriminator in the determined count result—can then be determined by means of the parameter control unit. This information is used to adapt at least the pulse shape and the clock rate of the clocked pulse-height discriminator, but optionally also the energy threshold of the continuously operating pulse-height discriminator, to the determined signal frequency in a dynamic fashion. In principle, the signal conditioner can be either designed as a separate component or integrated in the preamplifier.

The basic idea of at least one embodiment of the invention thus resides in improving the method according to the patent application having the official application number DE 10 2008 005 373.2 (the entire contents of which are hereby incorporated herein by reference), which does not have a prior publication date, to the effect that the signal pulses scanned in parallel by a continuous and by a clocked discriminator are subjected to conditioning in addition to amplification, wherein the conditioning, to be more precise the signal widening, is set as a function of the measured signal frequency. In the case of low frequencies, there is strong signal widening, with an improvement in the signal-to-noise ratio caused thereby, while the signal shape remains untouched at high frequencies. At the same time, it is also expedient, in the process, to shift the clock rate of the clocked pulse-height discriminator to lower frequencies as well in accordance with the signal widening. Moreover, the threshold of the continuously operating pulse-height discriminator can also be adapted, wherein a lower energy threshold is also used in the case where the signal is subjected to more flattening.

In accordance with this basic idea, the inventors in at least one embodiment, propose a method for determining the intensity of ionizing radiation using a detector with a multiplicity of direct-conversion detector elements, in particular for use in a CT system, wherein the radiation generates electrical signals with a certain pulse shape and signal frequency, and the number of the signal pulses is deemed a measure of the radiation intensity, having the following method steps:

- supplying the signal pulses to a preamplifier/signal conditioner;

supplying, in parallel or in series, the amplified and conditioned signal pulses, firstly, to a pulse-height discriminator operating continuously and with a predetermined energy threshold and, secondly, to a clocked pulse-height discriminator operating with a predetermined clock rate and a predetermined energy threshold;

registering the signal pulses by a combination logic; and transmitting the registered signal pulses to a counter.

The further improvement of at least one embodiment of this method now resides in the fact that provision is made for feedback, which changes the pulse shape of the signal pulses as a function of the signal frequency.

A first advantageous variant proposes to change the clock rate of the clocked pulse-height discriminator, at the same time as adapting the pulse shape.

The clock rate should expediently be adapted proportionally to the inverse of the changed signal conditioning time.

Furthermore, the energy threshold of the pulse-height discriminators can optionally also be changed as a function of the signal frequency, wherein the energy threshold should be correspondingly lowered in the case of a low signal frequency.

Increasing the energy threshold of the continuously operating pulse-height discriminator at high signal frequencies then simplifies differentiation between the individual signal pulses because the energy does not necessarily drop below the energy threshold in the case of many signal pulses incident in quick succession between the individual signals. A corresponding lifting of said energy threshold ensures this again. Furthermore, a disproportionately high increase of the energy threshold can be advantageous in the case of high pulse rates because it extends the dynamic range to higher fluxes.

At the same time, the clock rate of the clocked pulse-height discriminator can advantageously be adapted when the signal frequency changes. The signal pulses can thus be registered with a better count result. As the signal frequency decreases, the clock rate is reduced and, vice versa, as the signal frequency increases, the clock rate increases.

In addition to the method according to at least one embodiment of the invention, the inventors also propose a circuit arrangement for measuring signals of a direct-conversion detector, in particular for use in a CT system, wherein a continuously operating pulse-height discriminator and a clocked pulse-height discriminator are connected in parallel at one output of a preamplifier/signal conditioner, each pulse-height discriminator has one output, and the outputs of the pulse-height discriminators are connected to a counter via a combination logic, wherein provision is made for feedback, which, as a function of a signal frequency, controls the signal conditioner by way of a parameter control unit.

Advantageously, a connection for controlling the clock rate as a function of frequency is provided between the parameter control unit and the clocked pulse-height discriminator, and so, according to the invention, said clock rate is reduced as the signal frequency decreases.

It is also advantageous for there likewise to be a connection for controlling the energy threshold as a function of frequency between the parameter control unit and the continuously operating pulse-height discriminator. According to at least one embodiment of the invention, the energy threshold can then be lowered as the signal frequency decreases.

In an example embodiment of the circuit arrangement, the parameter control unit can have at least one look-up table, in which there is corresponding reference data, according to which the parameters to be controlled, i.e. clock rate and energy threshold, can be set.

Furthermore, it is advantageous for the parameter control unit to set the parameters to be controlled such that a variable or a combination of variables determined by the detector is or are kept constant, wherein the variable kept constant preferably is the contribution of the clocked pulse-height discriminator to the output signal.

There are further advantages of the method according to at least one embodiment of the invention and the circuit arrangement according to the invention over systems without clocked pulse-height discriminators. Namely, there is no paralysis-dependent ambiguity between registered count rate and photon flux when suitable parameters are chosen, and it is possible to adapt the effective energy threshold to the photon rate in an automatic fashion. This allows partial compensation for the "pile up"-effected change in the threshold response property.

BRIEF DESCRIPTION OF THE DRAWINGS

In the following text, the invention will be explained in more detail on the basis of preferred examples with the aid of the figures, with reference being made to the fact that only the essential elements required for the direct understanding of the invention are shown. Here, the following reference signs are used: 1: signal pulse; 2: preamplifier; 3: signal conditioner; 4: continuously operating pulse-height discriminator; 5: clocked pulse-height discriminator; 6: combination logic; 7: counter; 8: parameter control unit; 9, 9.1, 9.2: profile of a signal pulse; B: base level of the comparator inputs; C1: CT system; C2: first X-ray tube; C3: first detector; C6: gantry housing; C7: patient; C8: displaceable patient couch; C9: system axis; C10: control and computational unit; $E_1$: height of the energy threshold of the two pulse-height discriminators when adapting to a high signal frequency; $E_2$: height of the energy threshold of the two pulse-height discriminators when adapting to a low signal frequency; I: signal level; m.n: detector elements; $Prg_1$-$Prg_n$: computer programs or program modules; t: time; $t_x$: clock rate.

In detail.

DETAILED DESCRIPTION OF THE EXAMPLE EMBODIMENTS

Figure 1:
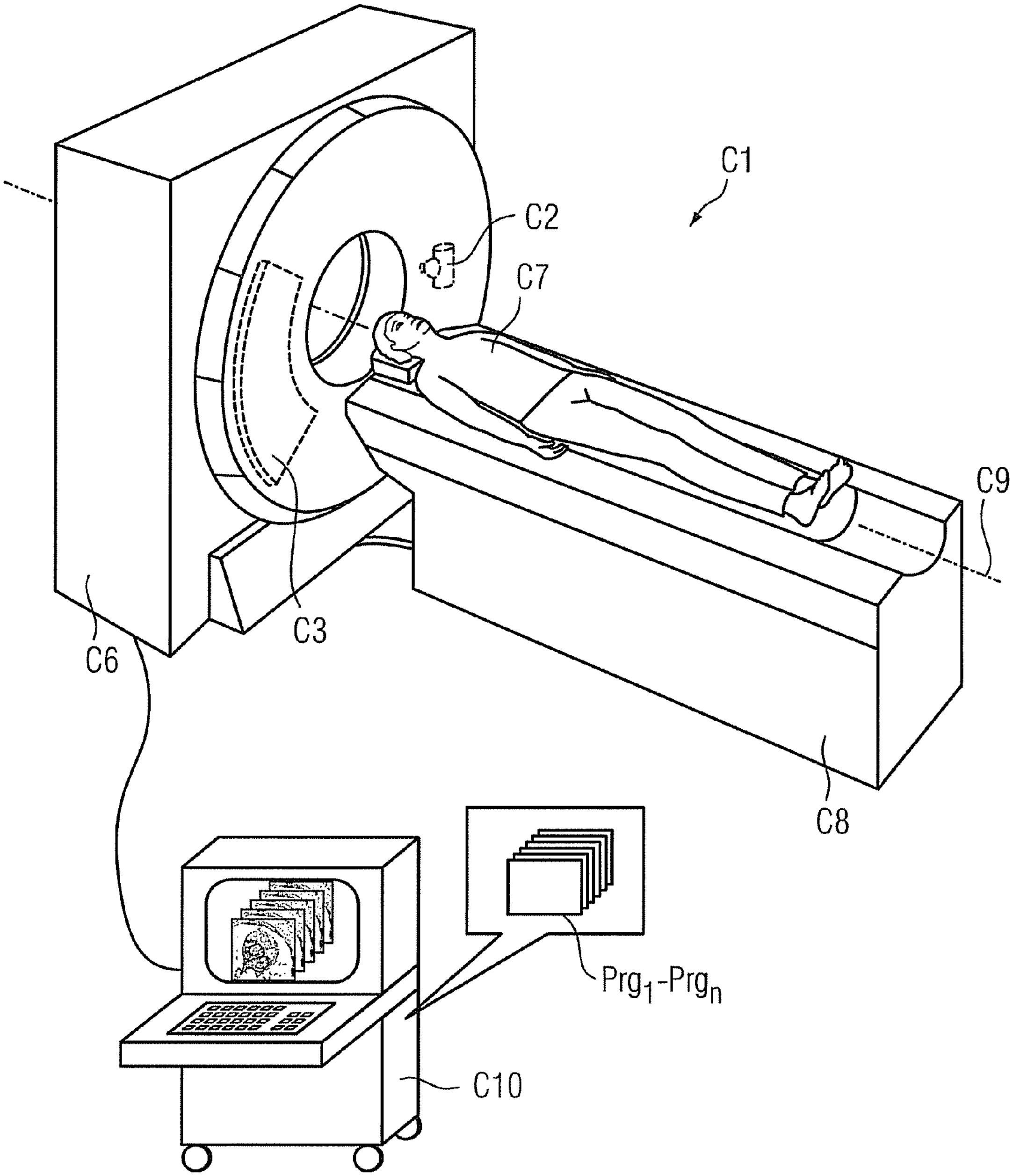
FIG. 1 shows a CT system with a detector according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The method according to an embodiment of the invention and the circuit arrangement according to an embodiment of the invention can be used in conjunction with any detector C3 with a multiplicity of direct-conversion detector elements, made of e.g. a semiconductor material. Here, FIG. 1 shows, in an exemplary fashion, a computed tomography system C1 with a detector C3 designed according to an embodiment of the invention. This CT system C1 has a gantry housing C6, which houses a gantry with an X-ray tube C2 that rotates about a system axis C9 together with a detector C3 lying opposite said X-ray tube C2. By way of example, a patient C7 lying on a patient couch C8 is pushed through the measurement field for the scan, while the X-ray tubes C2 and the detectors C3 on the gantry rotate about the system axis C9.

The signals detected by the detector C3 can be processed directly using detector electronics with the circuit according to an embodiment of the invention, or can be processed in a central control and computational unit C10 after being amplified correspondingly. Computer programs $Prg_1$-$Prg_n$ can also be stored in said unit, which programs, inter alia, execute the method according to an embodiment of the invention when in operation.

Reference is made to the fact that the method according to an embodiment of the invention and the circuit arrangement according to the invention are not limited to tomography applications, but can be applied on any particle-detecting or photon-detecting detector with direct-conversion detector elements.

Figure 2:
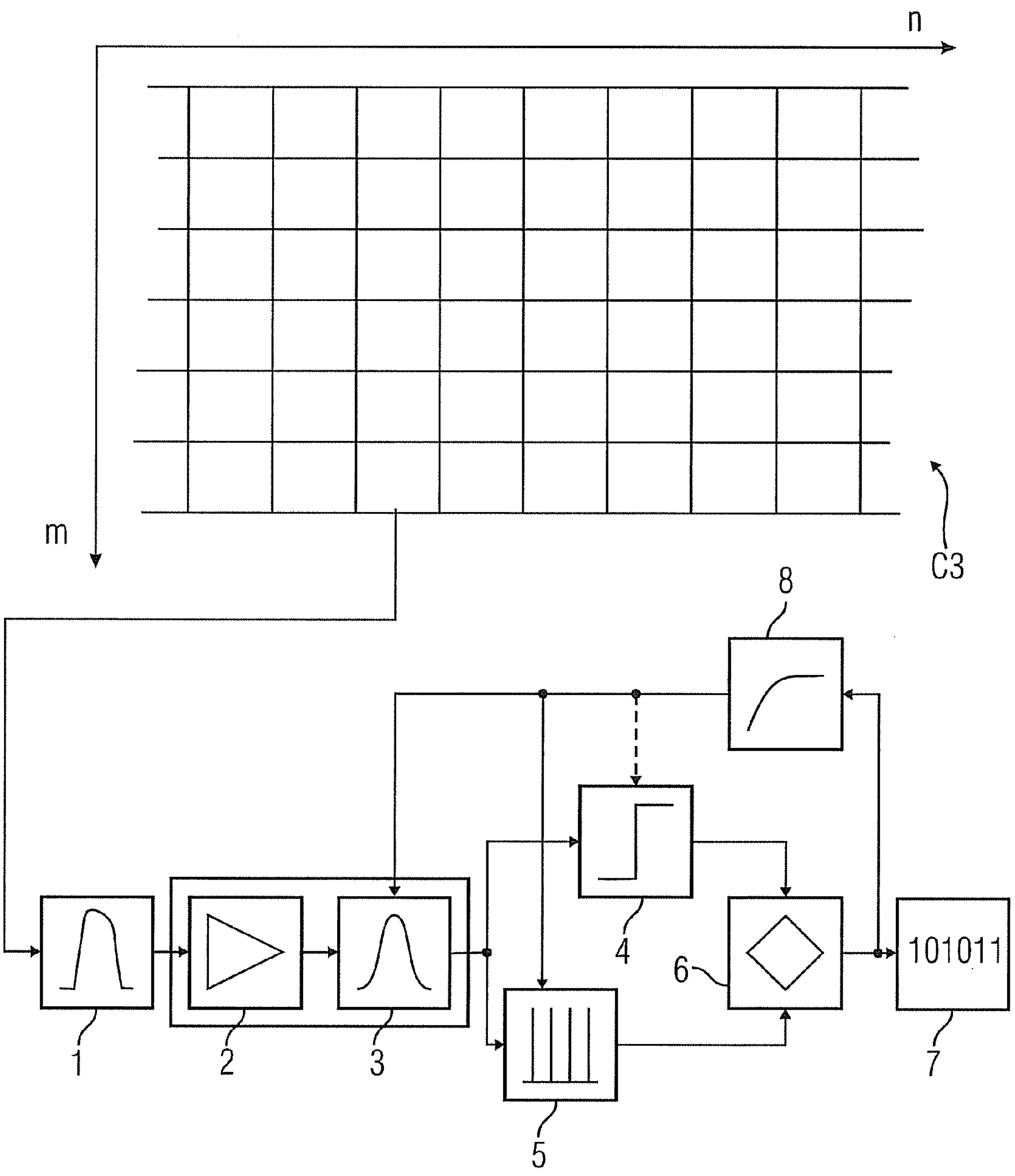
FIG. 2 shows a circuit arrangement according to an embodiment of the invention with feedback and a parameter control unit.

A preferred variant of the circuit arrangement according to an embodiment of the invention is illustrated schematically in FIG. 2. This figure shows the detector C3 with a multiplicity of detector elements m.n arranged in a checkerboard fashion, which elements each transmit their signal pulses 1 to a preamplifier/signal conditioner 2/3. The preamplifier 2 amplifies the signal pulses 1 and the signal conditioner 3 can change the shape of the incident signal pulses 1 as a function of the frequency of the latter. In this variant, the signal conditioner 3 is integrated into the preamplifier 2. The amplified and conditioned signal pulses 1 are transmitted to the continuously operating pulse-height discriminator 4 and the clocked pulse-height discriminator 5 connected in parallel thereto. The pulse-height discriminators 4 and 5 generate count signals in accordance with the received signal pulses 1 and in accordance with the respective functionality, which count signals are then transferred to the downstream combination logic 6. From there, they are transmitted to the counter 7.

The combination logic 6 is designed such that a first count result in the clocked pulse-height discriminator 5 is not counted each time an energy threshold is exceeded in the continuously operating pulse-height discriminator 4, which constitutes a positive count result for the continuously operating pulse-height discriminator 4, while all other count signals of both pulse-height discriminators 4 and 5 are transmitted.

According to an embodiment of the invention, there is feedback to a parameter control unit 8. There, the signal shape and, furthermore, the clock rate of the clocked pulse-height discriminator 5 are set as a function of the current signal frequency. Optionally, it is also possible to change the energy threshold of the continuously operating pulse-height discriminator 4.

Figure 3:
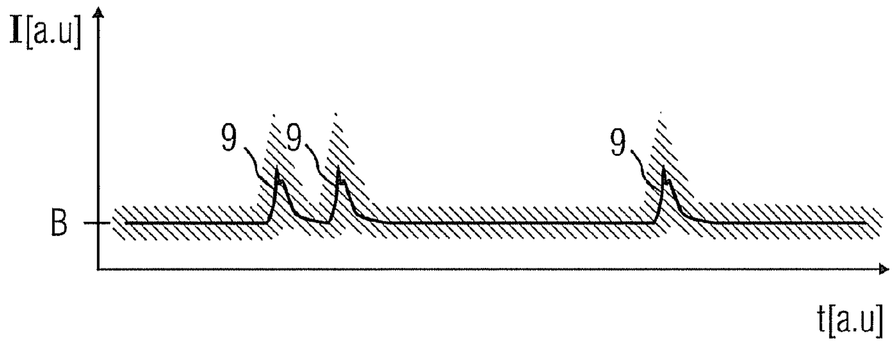
FIG. 3 shows a schematic illustration of three signal pulses with different time intervals.
Figure 4:
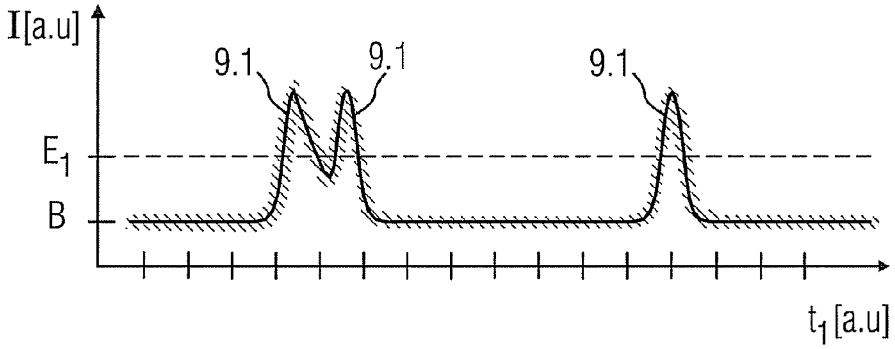
FIG. 4 shows a schematic illustration of the conditioned signal pulses as per FIG. 3 in the case of a short signal conditioning time.
Figure 5:
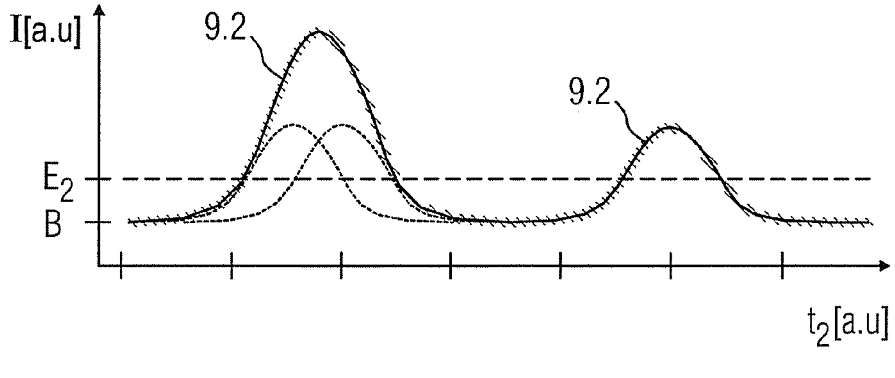
FIG. 5 shows a schematic illustration of the conditioned signal pulses as per FIG. 3 in the case of a long signal conditioning time.

FIGS. 3 to 5 illustrate, in a schematic overview, the functionality of the signal conditioner. The individual diagrams respectively show the profile 9, 9.1 and 9.2 of three signal pulses with different time intervals therebetween, wherein the detected signal intensity I is plotted over time t. Furthermore, the clocks of the clocked pulse-height discriminator are plotted on the time axis. If these are below the signal pulses, this indicates a positive count result; otherwise, it is a negative count result. The energy thresholds $E_1$ and $E_2$ of the pulse-height discriminators, adapted to high or low signal frequencies, are drawn as dashed lines. The base level B of the comparator inputs, which is set after complete decay of the signal pulses, is drawn as a solid line. The noise present in each case is indicated by shading about the respective signal profiles 9, 9.1 and 9.2.

In FIG. 3, the diagram plots three unchanged signal pulses 9 with different intervals therebetween. In this initial situation shown in an exemplary fashion, there is relatively strong noise. That is to say, the signal-to-noise ratio is inexpedient.

The next diagram, in FIG. 4, shows the same signal pulses as in FIG. 3, but this time after conditioning with a short signal conditioning time. The profiles 9.1 of the signal pulses are now significantly higher. The signal-to-noise ratio of the amplified signals 9.1 is better than in the input signals 9. The short signal conditioning time allows resolution of the closely spaced successive signal pulses. Both the energy threshold $E_1$ of both pulse-height discriminators and the clock rate $t_1$ is adapted to the short signal conditioning time.

In FIG. 5, the diagram illustrates the input signals from FIG. 3 conditioned by a long signal conditioning time. The conditioned signal pulses 9.2 are significantly higher than the input signals. The two closely spaced successive signal pulses are not resolved due to the longer pulse conditioning time and are instead registered as a single large signal pulse. Furthermore, the signal-to-noise ratio is better than in both cases shown above—see FIGS. 3 and 4—and this leads to an increased energy resolution in the case of sufficiently spaced individual pulses. The energy threshold $E_2$ of the two pulse-height discriminators, adapted to the longer signal conditioning time, and the clock rate $t_2$ are likewise illustrated.

It is understood that the features of the invention mentioned above can be used not only in the respectively specified combination, but also in other combinations or on their own, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining the intensity of ionizing radiation using a detector with a multiplicity of detector elements, wherein the radiation generates electrical signals with a certain pulse shape and signal frequency, and the number of the signal pulses is deemed a measure of the radiation intensity, the method comprising:

supplying the signal pulses to a preamplifier/signal conditioner;

supplying, in parallel or in series, the amplified and conditioned signal pulses, firstly, to a pulse-height discriminator operating continuously and with an energy threshold and, secondly, to a clocked pulse-height discriminator operating with a clock rate and an energy threshold;

registering the signal pulses by a combination logic; and transmitting the registered signal pulses to a counter, wherein provision is made for feedback, by which a pulse shape of the signal pulses are set as a function of the signal frequency, wherein a first count result in the clocked pulse-height discriminator is not counted.

2. The method as claimed in claim 1, wherein as the signal frequency decreases, the signal conditioning time increases, and vice versa.

3. The method as claimed in claim 2, wherein, additionally, as the signal frequency decreases, the clock rate of the clocked pulse-height discriminator is reduced, and vice versa.

4. The method as claimed in claim 1, wherein, additionally, the energy thresholds of the pulse-height discriminators are changed as a function of the signal frequency.

5. The method as claimed in claim 4, wherein, as the signal frequency decreases, the energy thresholds are lowered, and vice versa.

6. A circuit arrangement for measuring signals of a detector, comprising:

a continuously operating pulse-height discriminator and a clocked pulse-height discriminator, connected in parallel at one output of a preamplifier/signal conditioner, each of the continuously operating pulse-height discriminator and clocked pulse-height discriminator including one output, a counter, connected via a combination logic to the outputs of the continuously operating pulse-height discriminator and clocked pulse-height discriminator, wherein provision is made for feedback, which, as a function of a signal frequency, controls the preamplifier/signal conditioner by way of a parameter control unit and wherein the counter does not count a first count result from the clocked pulse-height discriminator.

7. The circuit arrangement as claimed in claim 6, wherein a connection for controlling the clock rate is provided between the parameter control unit and the clocked pulse-height discriminator.

8. The circuit arrangement as claimed in claim 6, wherein a connection for controlling the energy threshold is provided between the parameter control unit and the continuously operating pulse-height discriminator.

9. The circuit arrangement as claimed in claim 6, wherein the parameter control unit includes at least one look-up table, according to which the parameters to be controlled are set.

10. The circuit arrangement as claimed in claim 6, wherein the parameter control unit sets the parameters to be controlled such that a variable or a combination of variables determined by the detector is or are kept constant.

11. The circuit arrangement as claimed in claim 10, wherein the variable kept constant is the contribution of the clocked pulse-height discriminator to the output signal sent to the counter.

12. The circuit arrangement as claimed in claim 7, wherein a connection for controlling the energy threshold is provided between the parameter control unit and the continuously operating pulse-height discriminator.

13. The circuit arrangement as claimed in claim 6, wherein the circuit arrangement is for use in a CT system.

14. The method as claimed in claim 4, wherein the method is for use in a CT system.

15. A computer program product comprising a non-transitory computer readable medium including program segments for, when executed on a computer device, causing the computer device to implement the method of claim 1.

* * * * *